H. E. SMITH & N. H. BEEBE.
BROOM MAKING MACHINE.
APPLICATION FILED MAY 7, 1910. RENEWED MAR. 7, 1911.

990,072.

Patented Apr. 18, 1911.

5 SHEETS—SHEET 1.

H. E. SMITH & N. H. BEEBE.
BROOM MAKING MACHINE.
APPLICATION FILED MAY 7, 1910. RENEWED MAR. 7, 1911.

990,072.

Patented Apr. 18, 1911.

5 SHEETS—SHEET 2.

Witnesses
Lloyd W. Patch
A. A. Hammond

Inventors
Harry E. Smith
and Norman H. Beebe
By James Bagger
their Attorneys

H. E. SMITH & N. H. BEEBE.
BROOM MAKING MACHINE.
APPLICATION FILED MAY 7, 1910. RENEWED MAR. 7, 1911.

990,072.

Patented Apr. 18, 1911.

5 SHEETS—SHEET 3.

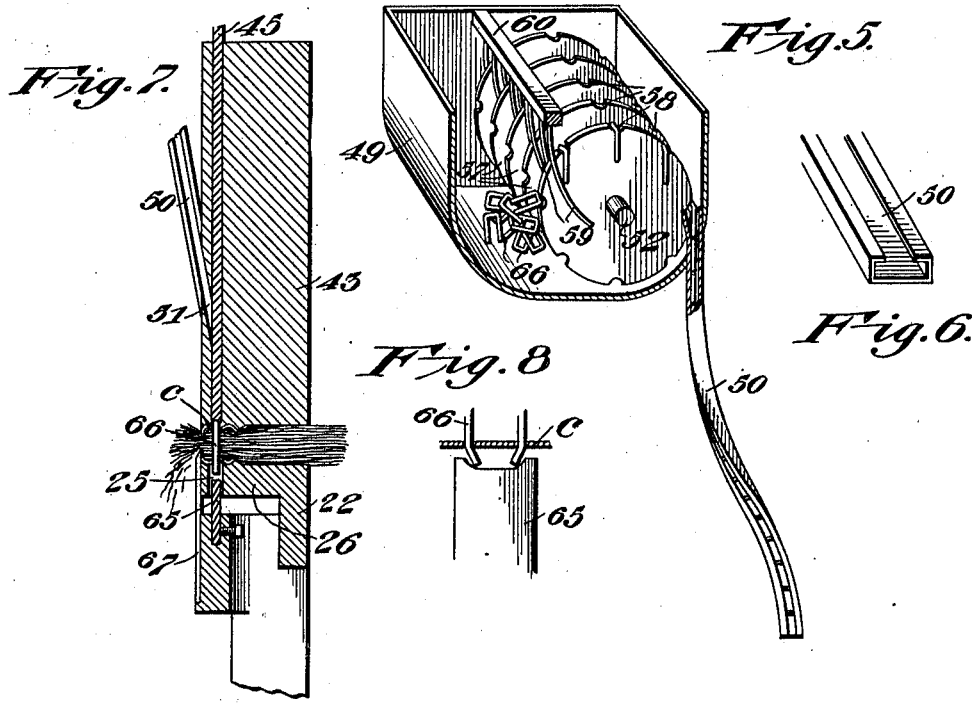

H. E. SMITH & N. H. BEEBE.
BROOM MAKING MACHINE.
APPLICATION FILED MAY 7, 1910. RENEWED MAR. 7, 1911.
990,072.
Patented Apr. 18, 1911.
5 SHEETS—SHEET 5.
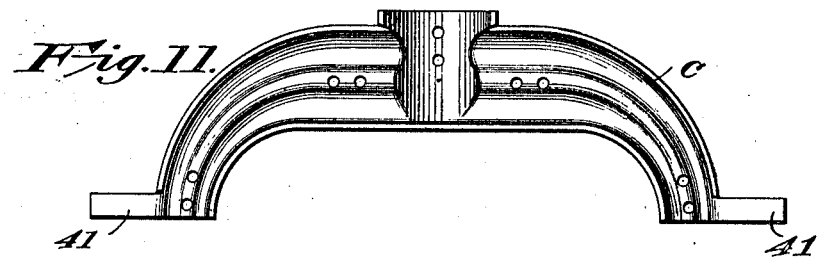
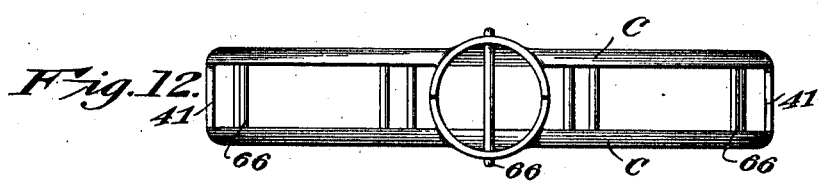
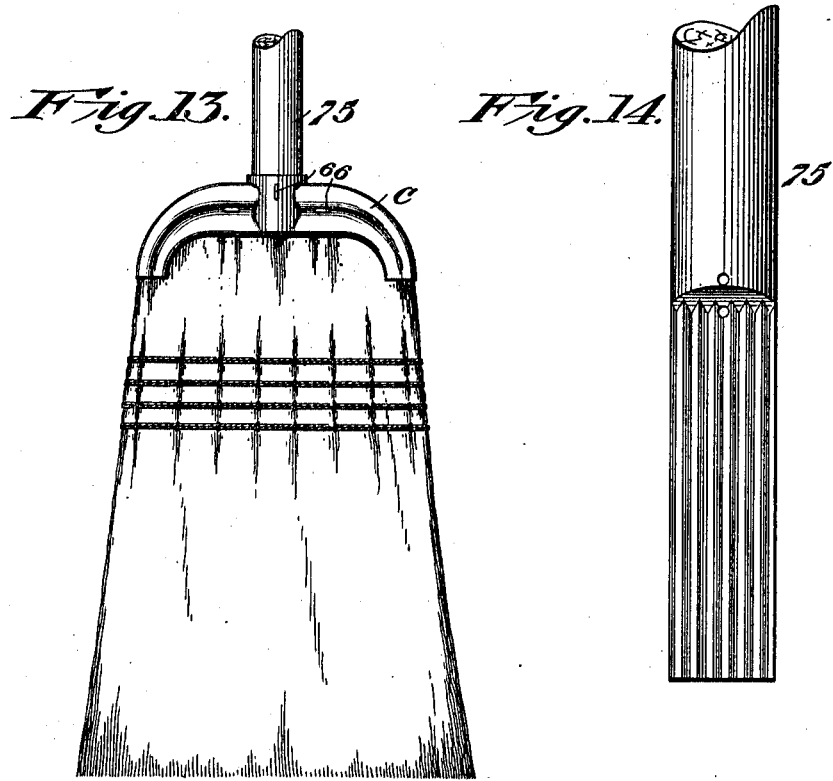
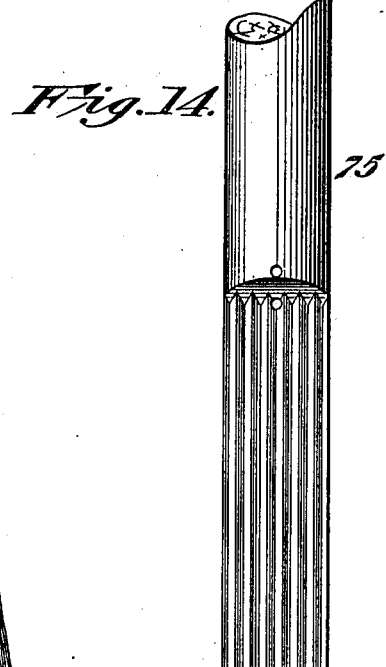
THE NORRIS PETERS CO., WASHINGTON, D. C.

UNITED STATES PATENT OFFICE.

HARRY E. SMITH AND NORMAN H. BEEBE, OF WICHITA, KANSAS, ASSIGNORS TO ADVANCE BROOM AND MANUFACTURING COMPANY, OF WICHITA, KANSAS.

BROOM-MAKING MACHINE.

990,072.            Specification of Letters Patent.      Patented Apr. 18, 1911.

Application filed May 7, 1910, Serial No. 559,978. Renewed March 7, 1911. Serial No. 612,926.

*To all whom it may concern:*

Be it known that we, HARRY E. SMITH and NORMAN H. BEEBE, citizens of the United States, residing at Wichita, in the county of Sedgwick and State of Kansas, have invented certain new and useful Improvements in Broom-Making Machines, of which the following is a specification.

Our invention relates to an improvement in broom machines, and the object is to provide means whereby the clamping members will be caused to be pressed against the corn or fibers and fastened together.

The invention consists in certain novel features of construction and combinations of parts which will be hereinafter fully described and pointed out in the claims.

Figure 1:
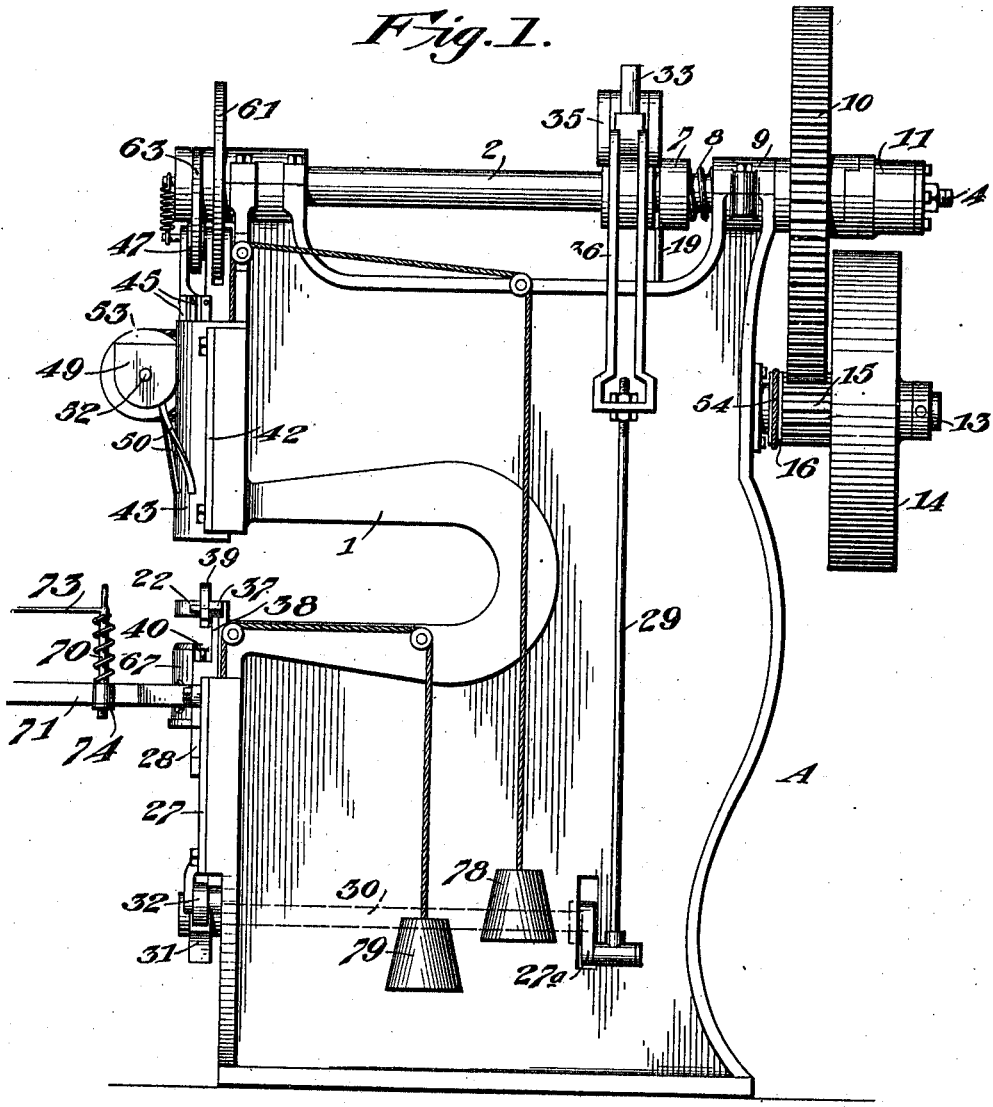
Figure 2:
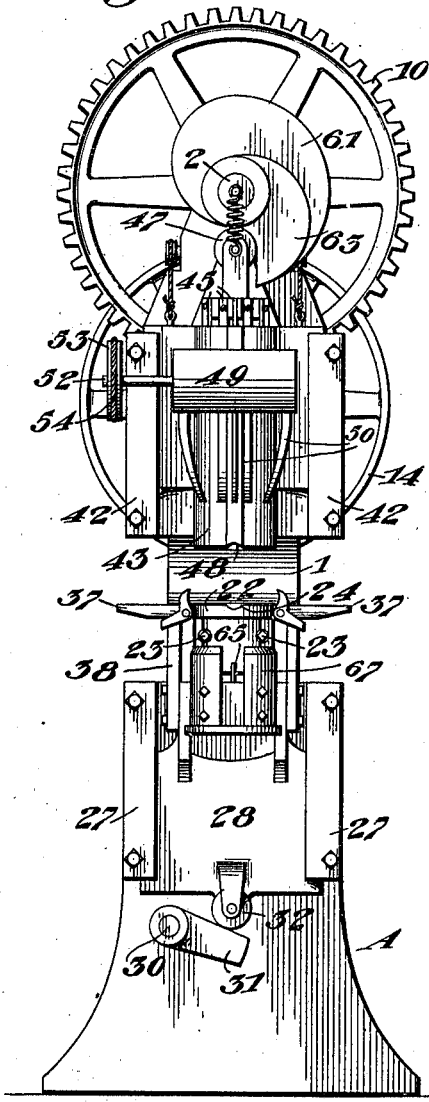
Figure 3:
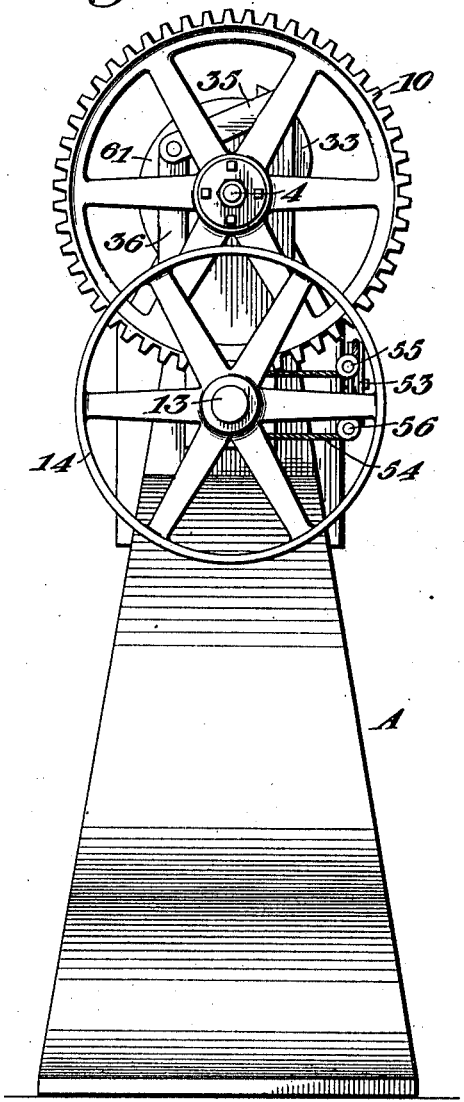
Figure 4:
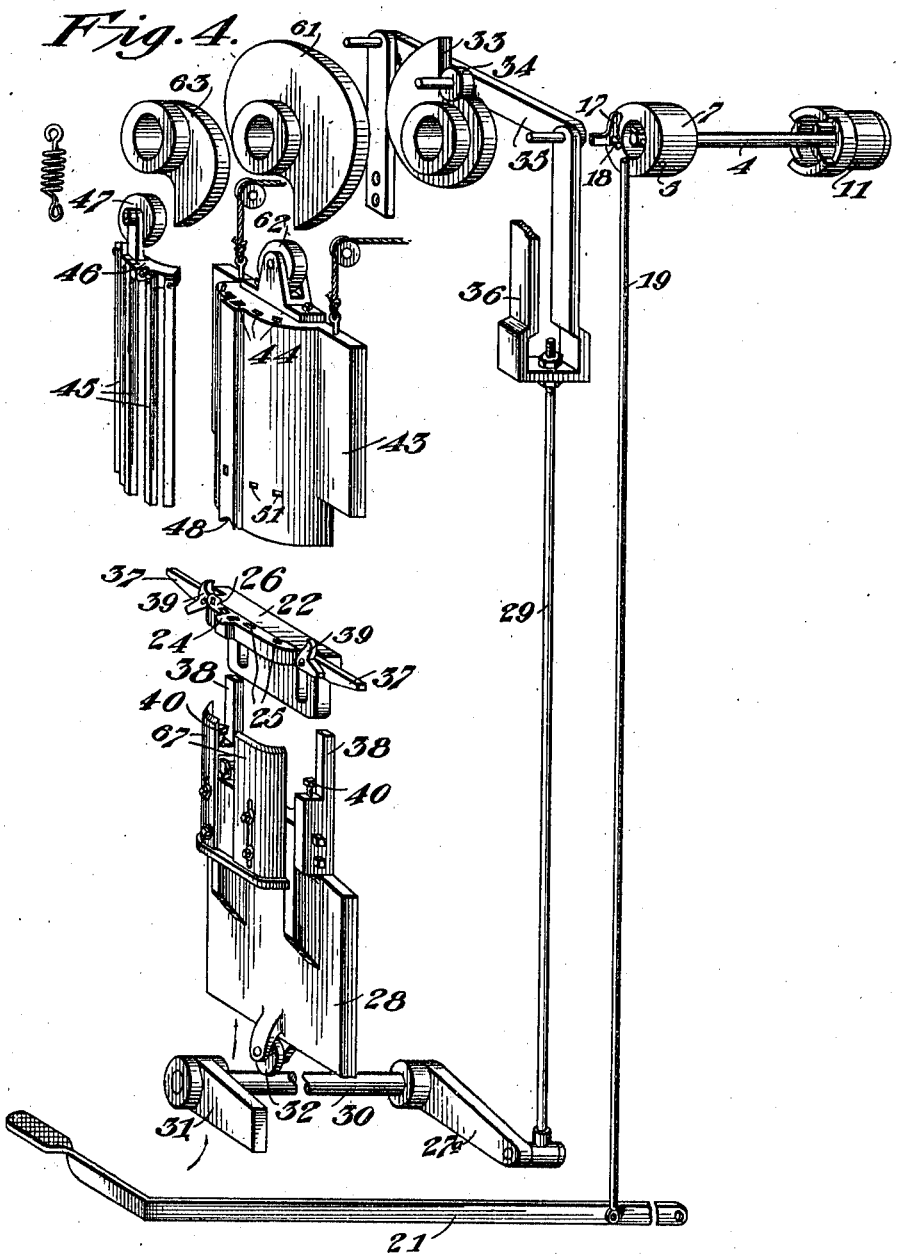

In the accompanying drawings:—Figure 1 is a view in side elevation; Fig. 2 is a front end view; Fig. 3 is a rear end view; Fig. 4 is a perspective view of the principal moving parts, showing them detached; Fig. 5 is a perspective view of the staple hopper, showing one of the tubes connected thereto and with one end removed; Fig. 6 is a detail view of the chute; Fig. 7 is a detail sectional view showing the manner of driving the staples through the clamping members and corn, and disclosing the manner of cutting off the end of the corn at the upper portion of the clamps; Fig. 8 is a detail view of one of the stationary plungers, showing the manner of clenching the staples; Fig. 9 is a longitudinal sectional view of the main operating shaft; Fig. 10 is a perspective view of the bracket upon which the broom handle is supported; Fig. 11 is a view in elevation of one of the clamping members; Fig. 12 is a plan view showing the two clamping members connected together; Fig. 13 is a view in side elevation of the completed broom; and Fig. 14 is a detail view of the broom handle.

A represents the body of the machine, which is provided with an enlarged mouth or slot 1, in which the broom is formed. Mounted upon the body is a shaft 2, which is provided with an opening 3 which runs longitudinally thereof. A rod 4 is mounted in the opening 3, and is connected to the shaft by a pin 5 which passes through slots 6 formed in the shaft. The pin passes into a collar 7 which is slidably mounted upon the shaft, a coil spring 8 bearing against the collar and one of the standards 9, for normally holding the rod at the inner end of the opening 3.

Loosely mounted upon the shaft 2 is a gear wheel 10. A clutch 11 is carried by the rod 4, and the clutch is keyed to the shaft 2 by key 12. The connection between the clutch 11 and the shaft 2 by the key 12 allows the clutch to rotate with the shaft, and yet have a sliding engagement therewith, whereby the clutch can be thrown into and out of engagement with gear wheel 10. When the clutch is in engagement with the gear wheel 10, the wheel will rotate with the shaft. The stationary shaft 13 is mounted upon the body A, and mounted upon the shaft is a pulley 14, which is driven by any suitable source of power. Connected to the pulley wheel is a pinion 15 which meshes with the gear wheel 10, and formed upon the pinion 15 is a pulley 16. A cam 17 is pivotally mounted upon the shaft 2 by means of a bolt 18. A tripping rod 19 is adapted to engage or be engaged by the cam, and pivotally connected to the rod is a foot lever 21, which is pivotally connected to the body of the machine.

Assuming that the clutch 11 is in engagement with the gear wheel 10, thereby causing the shaft and gear wheel to be rotated as the shaft rotates, the cam 17 will come in contact with the tripping rod 19, which will cause the cam to be thrown against the collar 7, forcing the rod 4 longitudinally, whereby the clutch will be thrown out of engagement with the wheel 10, and the shaft caused to remain idle.

When it is desired to start the shaft, the foot lever 21 will be operated, drawing the rod 19 out of engagement with the cam, which will allow the rod 14 to move inwardly, whereby the clutch will be thrown into engagement with the gear wheel 10, the spring 8 forcing the collar 7 to be moved upon the shaft, thereby drawing the rod 4 into the shaft 2.

A vertically adjustable bracket 22 is mounted upon the body at the lower side of the mouth 1 by bolts 23. The upper surface is provided with a concave portion 24, in which is received a convex portion of the clamp C, Fig. 11. Openings or passages 25 are formed along the outer face of the projecting flange 26 of the bracket, these openings passing entirely through the flange for the passage of the staples which connect the clamps together. Guides 27 on the body form a guide-way for the lower movable head 28. The head is caused to be moved upward by a crank shaft 30, which is provided with an arm 31, which engages a roller 32 on the head 28. A cam 33 on the shaft 2 engages a roller 34, carried by the arms 35, which are pivotally mounted upon the body, and which arms are connected by a link 36, to which is connected a rod 29 which is connected to the crank arm 27 of the crank shaft 30. As the shaft 2 is being rotated, the cam 33 will be rotated, and engages the roller 34, which will cause the arms 35 to be raised, drawing the rod 29 upward, and causing the crank shaft 30 to be rocked, whereby the lower head 28 will be moved upward, and the fingers 37, which are pivotally mounted on the bracket 22, will be moved vertically by the posts 38 on the head 28. These fingers 37 hold the corn or fibers between the two clamps C, so that as they are pressed together, the fiber will be prevented from being forced outward.

Pawls or dogs 39 are pivotally mounted upon the bracket 22. These dogs are adapted to be engaged by adjustable pins 40 which are mounted upon the head 28. As the pins engage the dogs, forcing them inward, they will engage the lips 41 on the lower clamp C, which is resting upon the bracket 22, causing the lips to be moved vertically for confining the fibers or corn between the clamps along the outer edges of the clamps.

Slidably mounted in guide-ways 42 is the upper movable head 43, which is provided with vertical passages or openings 44, in which plungers 45 are adapted to reciprocate, the plungers being carried by a bracket 46, to which is connected a roller 47. The lower portion of the head is concave, as at 48, for the reception of the convex portion of the clamp C upon which the head will be received in pressing the clamps together for securing the corn between the clamps. The upper face of the bracket 22, and the lower face of the movable head 43, are corrugated to conform to the corrugated surface of the clamps C, as indicated in Fig. 7, the face of the upper form being a permanent magnet which will retain one of the clamps in position, holding it for and during the pressing operation.

Mounted upon the head 43 is a hopper 49 for the reception of the staples. Chutes 50 are connected to the hopper, and lead to openings 51 which communicate with the passage-ways 44. Journaled in the hopper is a shaft 52, which is provided with a pulley 53. An endless belt 54 passes around the pulley 53, and around the pulleys 55 and 56 on the body A, and then around the pulley 16, whereby the shaft is rotated. Mounted upon the shaft are a plurality of disks 57, which are provided with notches 58, in which one staple is capable of being received and supported. The upper ends of the chutes 50 are split, permitting the disks to pass between the split portions, whereby the staples will be delivered to the chute directly from the disks. Fingers 59, mounted on a bar 60, are received on each side of the disks 58, to prevent the staples being carried over the wheel more than one at a time—that is, preventing more than one staple being received in a single notch and carried over and delivered to the chute 50.

A cam 61 is mounted on the shaft 2, and is adapted to engage the roller 62 mounted on the movable head 53, for forcing the head downward upon the operation of the shaft toward the upwardly moving head 28. The head 43 will move down upon the bracket 22, compressing the corn or fiber between the clamps which are carried by the bracket and movable head 43. During this operation, the cam 63 on the shaft 2 is engaging the roller 47 of the plungers 45, causing them to be moved downward through the passages 44, and after the corn has become sufficiently compressed, the plungers will each engage a pin which has been delivered through the openings 51 and force them through the openings in the clamps, and through the openings 25 in the flange 26 of the bracket 22. The continued upward movement of the lower head 28 will cause the stationary plungers 65, carried by the head, to engage the ends of the staples 66, causing them to be clenched upon one of the clamps C, as is clearly indicated in Figs. 7 and 8. The cutters 67, on the head 28, will cut off the ends of the fiber or corn which project beyond the upper curved surfaces of the clamps. These cutters 67 are capable of vertical adjustment upon the movable head, whereby brooms of different thicknesses can be properly trimmed.

A bracket 68, which is connected to the frame, carries a forked post 69, and a movable forked post 70, the lower end of the post 70 being connected by a nut 74 for limiting its upward movement through the bracket, a coil spring 72 engaging the post for normally forcing it upward. A bar 73 connects the two posts together. The nut 74 regulates the height of the post 70. The broom handle 75 is supported by the posts, and the adjustable stop 76 which is mounted upon the bracket, insures the holding of the handle in the proper position whereby the corn fibers can be clamped properly around it, and the handle securely fastened between the clamps.

Counterweights 78 and 79 are connected to the movable heads 43 and 28, respectively, for returning them to their normal positions.

The operation of the parts has been set forth, but to briefly summarize, the shaft 2 is caused to be rotated upon the release of the cam 17, which allows the clutch 11 to engage the gear wheel 10, power being transmitted to the wheel through the pinion 15, which derives its power from the pulley 14. Continued rotation of the shaft 2 causes the cams 33, 61 and 45 to be rotated, the cam 33 causing the crank shaft 30 to be operated, whereby the lower head 28 is moved vertically, and the cam 61 engaging the movable head 43 for moving it downward, the clamps C having been placed in position, one held by the bracket 22 and the other by the movable head 43, the handle and corn having been placed in position, the clamps will be brought together, compressing the corn there-between. The plungers 45, which are suspended from the shaft 2 by the coil spring 77, are caused to be lowered in the head 43 by the engagement of the cam 45. The plungers engage and force the staples, which are delivered to the passages 44 in the head 43 through which the plungers travel, causing them to be forced through the clamps, whereby the staples are clenched by the plungers carried by the upwardly moving head 28, and the knives 67 on the movable head 28 move to cut the projecting fibers along the curved upper portion of the clamps. By this time, the shaft will have made a complete revolution, and the cam 17 will be engaged by the tripping rod 19, causing the cam to engage the collar 5 on the shaft 2 for forcing the rod 4 longitudinally of the shaft, whereby the clutch is released or disengaged from the wheel 10, causing the shaft to remain idle and the gear wheel to continue to revolve. The plungers 45 will move upwardly with the head 43, but the passages 51 will be closed, and the staples cannot be discharged in the passages 44 until the head moves downward, the head 43 moving prior to the movement of the plungers, or sufficiently in advance to allow the admittance of the staples to the passages 44, whereby they will be engaged upon the downward movement of the plungers for forcing them through the clamping members.

The first action is in the raising of the head 28, which causes the fingers 37 to be raised, then the head 43 is moved downwardly, compressing the fiber between the clamps, and as the head 43 ceases its downward motion, the cam 63 forces the plungers 45 downward, driving the staples through the clamps and corn.

When it is desired to cause the machine to operate again for the next broom, the tripping rod 19 is operated by means of the foot lever 21 for releasing the cam 17 from engagement with the collar, whereby the clutch 11 will be thrown into engagement with the wheel 10 and the shaft caused to rotate.

Having fully described our invention, what we claim as new and desire to secure by Letters Patent, is:—

1. In a broom machine, the combination with a body, of a movable head, means for supporting broom clamps, means for operating the head for causing fibers to be compressed, and means for cutting the fibers.

2. In a broom machine, the combination with a body, of movable heads, means for operating the heads whereby one head will compress fibers and the other trim the fibers and means for causing the fibers to be fastened together while under compression.

3. In a broom machine, the combination with a body, of movable heads, means for operating the heads whereby fibers will be compressed, means for forcing staples through the fibers which staples are adapted to be clenched by the other moving head, and means on the last-named head for trimming the fibers.

4. In a broom machine, the combination with a body having a bracket thereon, of movable heads, one of the heads and the bracket supporting broom clamps, means for moving the heads whereby one of the latter will compress the fibers, and means on the other head adapted to trim the fibers.

5. In a broom machine, the combination with a body having a bracket thereon, provided with fingers and dogs, of upper and lower heads, means for operating the heads, the upper head and bracket adapted to support broom clamps which clamps are provided with lips, the lower head adapted to raise the fingers for holding the fibers in position, said upper head adapted to compress the fibers between the clamps, said lower head adapted to actuate the dogs for causing the lips on the clamps to be bent into position for holding the fibers between the clamps.

6. In a broom machine, the combination with a body having a bracket thereon, fingers and dogs, of upper and lower heads, means for operating the heads, the upper head and bracket adapted to support broom clamps which clamps are provided with lips, the lower head adapted to raise the fingers for holding the fibers in position, said upper head adapted to compress the fibers between the clamps, said lower head adapted to actuate the dogs for causing the lips on the clamps to be bent into position for holding the fibers between the clamps, and means for connecting the clamps and fibers together.

In testimony whereof we affix our signatures, in the presence of two witnesses.

HARRY E. SMITH.
NORMAN H. BEEBE.

Witnesses:
M. A. WETMORE,
F. W. WETMORE.

Copies of this patent may be obtained for five cents each, by addressing the "Commissioner of Patents, Washington, D. C."